US007759673B2

(12) United States Patent
Gidon et al.

(10) Patent No.: US 7,759,673 B2
(45) Date of Patent: Jul. 20, 2010

(54) DATA RECORDING SYSTEM AND METHOD FOR USING SAME

(75) Inventors: Serge Gidon, La Murette (FR); Gilles Le Carval, Grenoble (FR); Jean-Frederic Clerc, Brie et Angonnes (FR)

(73) Assignee: Commissariat a l'Energie Atomique, Paris (FR)

( * ) Notice: Subject to any disclaimer, the term of this patent is extended or adjusted under 35 U.S.C. 154(b) by 607 days.

(21) Appl. No.: 11/579,730

(22) PCT Filed: Apr. 29, 2005

(86) PCT No.: PCT/FR2005/001069

§ 371 (c)(1),
(2), (4) Date: Nov. 6, 2006

(87) PCT Pub. No.: WO2005/122161

PCT Pub. Date: Dec. 22, 2005

(65) Prior Publication Data

US 2007/0274192 A1    Nov. 29, 2007

(30) Foreign Application Priority Data

May 4, 2004    (FR) .................................. 04 04770

(51) Int. Cl.
*H01L 31/00*    (2006.01)
(52) U.S. Cl. ........................................ 257/20; 369/126
(58) Field of Classification Search ................ 438/260; 257/314–316, 200, 296
See application file for complete search history.

(56) References Cited

U.S. PATENT DOCUMENTS

| 3,819,959 | A | * | 6/1974 | Chang et al. ................. 327/271 |
| 5,018,018 | A | | 5/1991 | Takanashi et al. |
| 5,314,569 | A | * | 5/1994 | Pribat et al. .................... 117/75 |
| 5,835,477 | A | * | 11/1998 | Binnig et al. ................ 369/126 |
| 6,404,018 | B1 | * | 6/2002 | Wu et al. ...................... 257/368 |
| 6,836,956 | B2 | * | 1/2005 | Sasaki ...................... 29/603.15 |

(Continued)

FOREIGN PATENT DOCUMENTS

EP    1 227 496 A1    7/2002

OTHER PUBLICATIONS

M.J. Yoo et al., "Scanning Single-Electron Transistor Microscopy: Imaging Indivicual Charges", Science 276, p. 25 1997.*

(Continued)

*Primary Examiner*—Thanh V Pham
*Assistant Examiner*—Mark A Laurenzi, III
(74) *Attorney, Agent, or Firm*—Oliff & Berridge, PLC

(57) ABSTRACT

A storage layer is arranged facing an array of micro-tips. The storage layer includes a plurality of insulated conductive dots designed to store electric charges. Each micro-tip includes a high-permittivity element integral to a transistor channel connecting a source and a drain. The channel has a conductance able to be modified by the electric field created by the charge of the dot arranged facing the high-permittivity element. The system can include an actuator for relative displacement of the storage layer with respect to the micro-tips. The system can include an array of electrodes able to cause displacement of the charges from one dot to the other.

12 Claims, 3 Drawing Sheets

U.S. PATENT DOCUMENTS

2002/0088996 A1* 7/2002 Yoo et al. .................. 257/200
2004/0056318 A1* 3/2004 Smith ........................ 257/393

OTHER PUBLICATIONS

M. J. Yoo, et al.; (1997); "Scanning Single-Electron Transistor Microscopy: Imaging Individual Charges"; Science, vol. 276; pp. 579-582.

P. Vettiger, et al.; (2000); "The "Millipede"-More than one thousand tips for future AFM data storage"; IBM J. Res. Develop. vol. 44, No. 3; pp. 323-340.

D.M. Schaadt, et al.; (1999); "Charge storage in Co nanoclusters embedded in Si02 by scanning force microscopy"; Applied Physics Letters, vol. 74, No. 3; pp. 472-474.

E.A. Boer, et al.; (2001); "Charging of single Si nanocrystals by atomic force microscopy"; Applied Physics Letters; vol. 78, No. 20; pp. 3133-3135.

* cited by examiner

DATA RECORDING SYSTEM AND METHOD FOR USING SAME

BACKGROUND OF THE INVENTION

The invention relates to a data recording system comprising a recording medium comprising a storage layer able to store data and a data read and/or write device comprising an array of micro-tips arranged facing the storage layer.

STATE OF THE ART

Data recording under micro-tips is possible using numerous approaches, for example by magnetic, optic, electric or thermal effect. Generally speaking, an array of micro-tips comes into contact or into quasi-contact with a data storage medium to locally modify properties thereof in order to encode data. These techniques are based on data encodings in as widely varying forms as holes in a layer of plastic materials or different crystallization states for phase-change materials. The data is then read, i.e. detected, by means of the micro-tips.

The Millipede® technique of the IBM corporation, for example, uses an array of micro-tips to write and read data on a support medium made from polymer material by a thermo-mechanical method ("The Millipede—More than one thousand tips for future AFM data storage" by P. Vettiger et al. in IBM J. Res. Develop., Vol. 44, No. 3, May 2000). However, this technique requires a great deal of energy to heat the micro-tips to a temperature of around 400° C.

Another technique uses the conductivity change of phase-change materials by electric writing. However, reading such memory dots requires complex energy-consuming electronics.

The article "Charging of single Si nanocrystals by atomic force microscopy" by E. A. Boer et al. (Applied Physics Letters, Vol. 78, No. 20, 14 May 2001) describes charge injection in nanocrystals arranged on an insulating surface and detection of the charge by means of an Atomic Force Microscope (AFM).

The article "Charge storage in Co nanoclusters embedded in $SiO_2$ by scanning force microscopy" by D. M. Schaadt et al. (Applied Physics Letters, Vol. 74, No. 3, 18 Jan. 1999) describes charge storage in nanoclusters inserted in silica and charge detection by means of a micro-tip. The clusters are charged by applying voltage pulses between the micro-tip and the clusters.

The article "Scanning Single-Electron Transistor Microscopy: Imaging Individual Charges" by M. J. Yoo et al. (Science, Vol. 276, 25 Apr. 1997) describes a tip comprising a Single Electron Transistor (SET) at the apex thereof enabling the electric charge distribution to be detected on a surface of a sample.

OBJECT OF THE INVENTION

It is one object of the invention to remedy these shortcomings and, in particular, to enable a recording system having a very high storage density to be achieved.

According to the invention, this object is achieved by the appended claims and, in particular, by the fact that the storage layer comprises a plurality of electrically insulated conductive dots designed to store electric charges according to the data to be stored and creating corresponding electric fields, each micro-tip comprising a high-permittivity element integral to a transistor channel connecting a source and a drain, the channel having a conductance able to be modified by the electric field created by the charge of the dot arranged facing the high-permittivity element, the system comprising means for relative displacement of the charges with respect to the micro-tips.

It is a further object of the invention to provide a method for using the data recording system according to the invention, comprising a write step comprising injection of a charge into the storage layer by applying a potential difference between the control electrode and the source.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
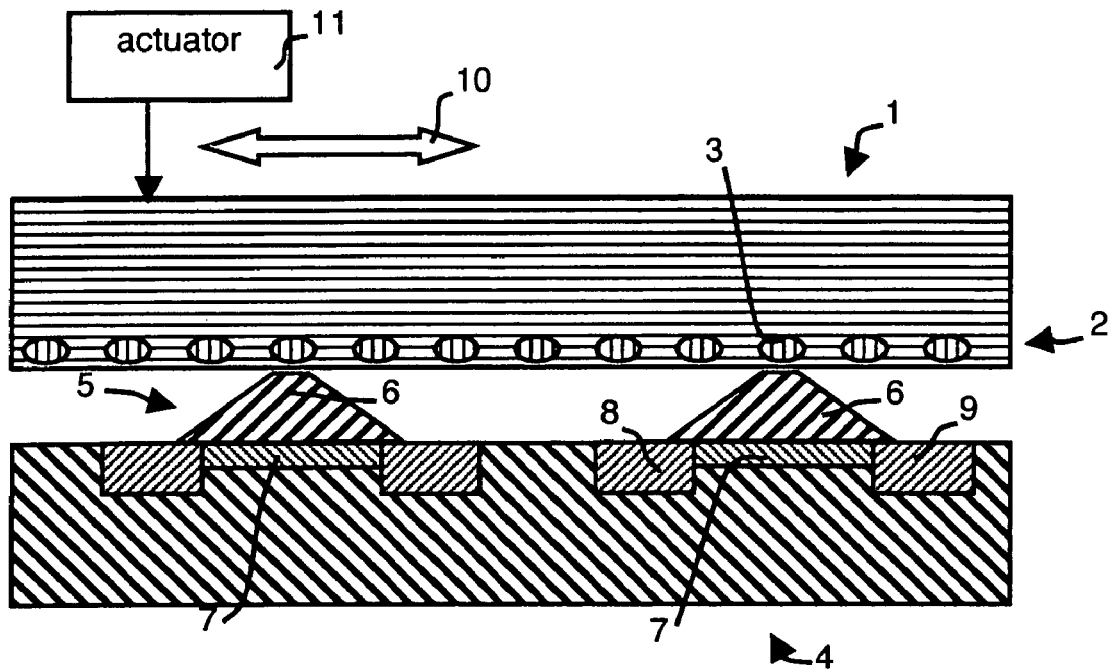
FIG. 1 illustrates a particular embodiment of a data recording system according to the invention.

The data recording system represented in FIG. 1 comprises a recording medium 1 comprising a storage layer 2 designed to be able to store data. The storage layer 2 comprises a plurality of electrically insulated conductive dots 3 enabling positive or negative electric charges creating corresponding electric fields to be stored on the dots 3. The charges depend on the data to be stored, for example a negatively charged dot 3 corresponds to a "1" binary data bit and an electrically neutral dot 3 corresponds to a "0" binary data bit. What is also meant by the expression "conductive dots" is semi-conductive dots, for example made of silicon, and dots having a low conductivity, for example made of carbon.

A data read and/or write device 4 comprises an array of micro-tips 5 arranged facing the storage layer 2. Each micro-tip 5 comprises a high-permittivity element 6 integral to a transistor channel 7 connecting a source 8 and a drain 9. The high-permittivity element 6 preferably has the shape of a truncated pyramid or cone the base whereof is integral to the transistor channel 7. Each channel 7 has a conductance that is able to be modified by the electric field created by the charge of the dot 3 arranged facing the corresponding high-permittivity element 6. Thus, the charge state of said dot 3 is detected by measuring a current flowing from the source 8 to the drain 9.

The dots 3 have considerably smaller dimensions than the dimensions of the transistor channel 7, and several dots 3 can be associated with each micro-tip 5 and thereby with each channel 7. In the embodiment represented in FIG. 1, the storage layer 2 can be displaced laterally with respect to the micro-tips 5, as indicated by an arrow 10, by means of an actuator 11. Thus, the charges arranged on the dots 3 are displaced, along with the dots 3, relatively to the micro-tips 5. It is also possible to displace the array of micro-tips 5, by means of an actuator, to obtain a relative displacement of the dots and charges with respect to the micro-tips 5. Thus, the charges on different dots 3 can be detected by a single micro-tip 5 associated with said dots 3, even if the distance between two adjacent dots is less than 5 nm, and therefore substantially less than the width of the channel 7, which may be about 20 nm using the most advanced technologies.

The storage layer 2 can be formed by conductive particles, for example made of aluminium, forming the dots 3 and inserted in an insulating material, for example an oxide, for example alumina. As an alternative, the storage layer 2 can be formed by silica, for example in the form of Silicon Rich Oxide (SRO), and the conductive particles can essentially comprise silicon. Depending on the particular fabrication conditions of the storage layer, the distribution of the conductive particles may be random. Moreover, several conductive particles can form a dot 3 and/or several dots 3 can form a common storage zone for storing a charge representative, for example, of a binary data bit.

In the particular embodiment represented in FIG. 1, the transistor channel 7 is formed by a material doped by a first type of doping, for example N-type (respectively P-type), and the source 8 and drain 9 are formed by a material doped by a second type of doping, for example P-type (respectively N-type). In this way, the channel 7, source 8 and drain 9 present the same structure as the channel, source and drain of a MOSFET transistor, the dot 3 performing a transistor gate electrode function and the high-permittivity element 6 playing the role of transistor gate insulator, in particular for electric insulation between the dot 3 and channel 7 on the one hand, and ensuring efficient transmission of the electric field lines between the dot 3 and channel 7 on the other hand. The assembly formed by the channel 7, source 8, drain 9, dot 3 and element 6 therefore operates as a MOSFET transistor.

The effective distance between a dot 3 and the channel 7, when a read is performed, must not exceed a certain limit determined by the equivalent of around 1 nm of silica, which corresponds to 20 nm of a high-permittivity material such as for example $HfO_2$, $GdO_3$ or $Y_3O_3$. The dots 3 are preferably located very close to the surface of the storage layer 2. The height of the high-permittivity element 6 can then be about 20 nm, which is about the same as the width of the channel 7. The dots 3 can also be buried in the storage layer 2, under an insulating layer which may be made of high-permittivity material, enabling the dots 3 to be protected, in particular in the case where a relative displacement of the storage layer 2 with respect to the micro-tips 5 is scheduled.

Figure 2:
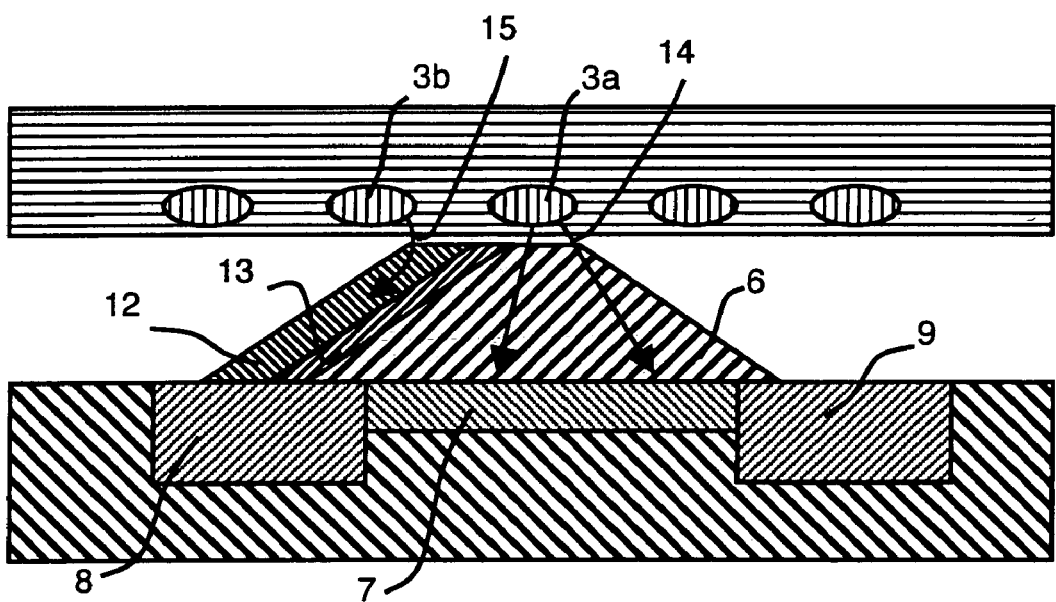
FIGS. 2 to 4 represent three particular embodiments of a micro-tip of a data recording system according to the invention.

In FIG. 2, the micro-tip 5 comprises a high-permittivity layer 12 arranged laterally on the micro-tip 5 and separated from the high-permittivity element 6 by a low-permittivity layer 13. The electric field 14 created by the charge of a predetermined dot 3a disposed facing the micro-tip 5 is thus transmitted to the channel 7, whereas the electric field 15 created by an adjacent dot 3b is diverted. The high-permittivity layer 12 in fact intercepts the field lines, which are moreover diverted from the low-permittivity layer 13. The low-permittivity layer 13 and the high-permittivity layer 12 can then have a thickness of about 1 nm to 5 nm. This then enables the field lines to be channelled and only the charge of the predetermined dot 3a to be detected, in particular in the case where the distance between two adjacent dots is around a few nanometers.

Figure 3:
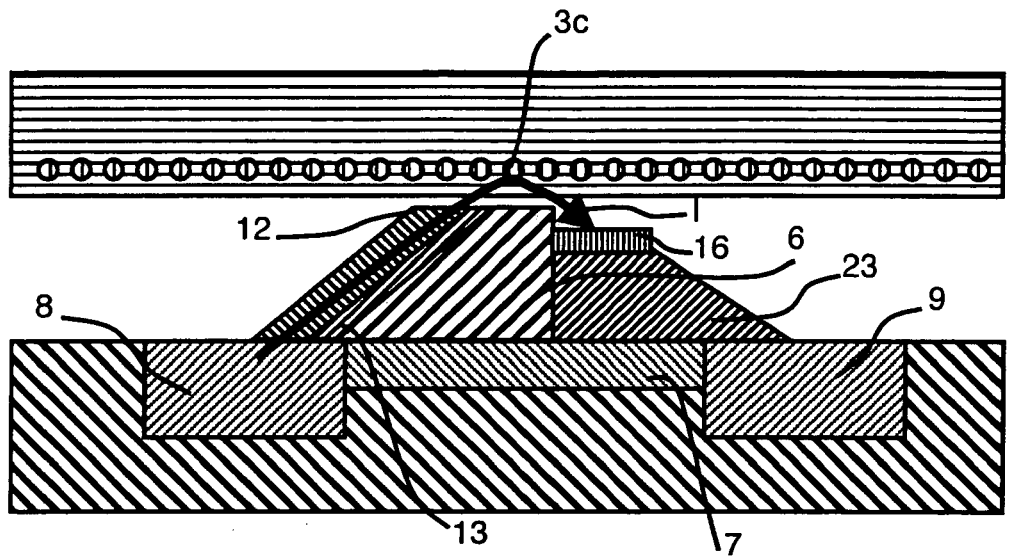

The micro-tip 5 represented in FIG. 3 comprises a control electrode 16 preferably located at the edge of the high-permittivity element 6 and on the same side as the drain 9 and separated from the channel 7 by a layer 23 of insulating material which can advantageously be the material of the element 6. The control electrode 16 enables the operating point of the transistor formed by the channel 7, source 8, drain 9 and dot 3 to be adjusted. During rest phases, the control electrode 16 is electrically insulated, for example by means of an additional MOSFET transistor, turned off in a high-impedance state to avoid discharging of the dots 3 by leakage currents.

The control electrode 16 also enables a write step to be performed. The write step can comprise charge injection into the storage layer 2 by applying a potential difference between the control electrode 16 and source 8. Thus, an electric current I flows from the source 8 to the control electrode 16, as represented by an arrow in FIG. 3. A part of this current is injected by tunnel effect into a dot 3c arranged facing the micro-tip 5. The electric potential of the control electrode 16 is preferably positive and higher than the potential of the source 8, so as to obtain an electron current in the direction of the control electrode 16, in the direction of the arrow in FIG. 3.

Figure 4:
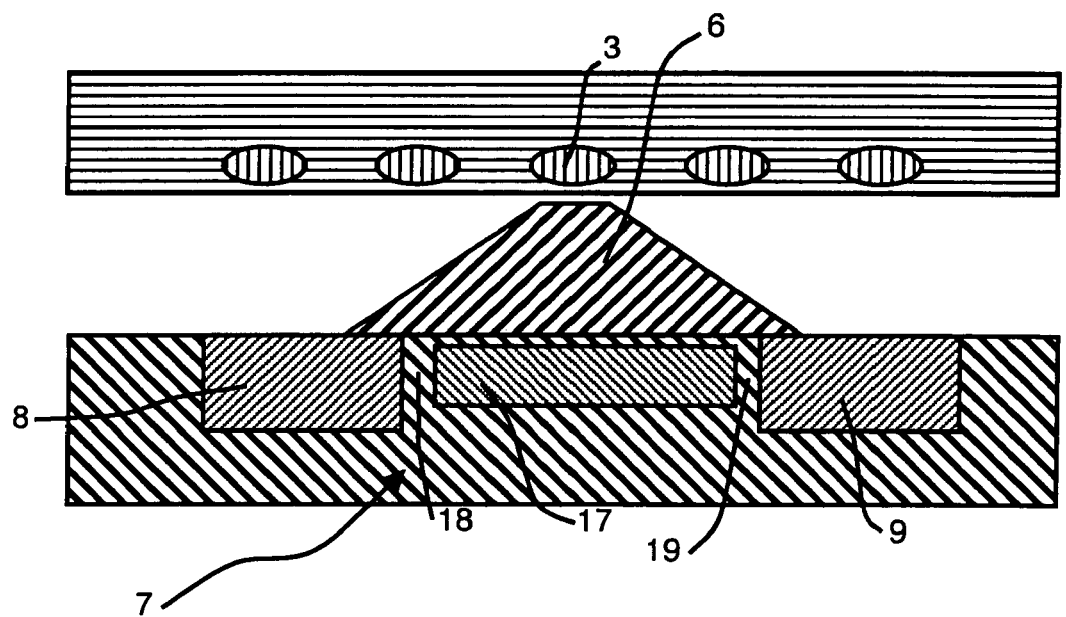

In FIG. 4, the transistor channel 7 comprises a second conductive dot 17 connected to the source 8 and drain 9 respectively by tunnel junctions 18 and 19. The assembly comprising the channel 7, source 8, drain 9 and dot 3 thus forms a Single Electron Transistor (SET) transistor. In this case, the micro-tip 5 preferably comprises a control electrode 16 (not shown in FIG. 4) for adjusting the operating point of the SET transistor and, if required, for compensating the influence of charge impurities located near to the second dot 17. Likewise, the micro-tip 5 can advantageously comprise a low-permittivity layer 13 and a high-permittivity layer 12 on the surface thereof.

Figure 5:
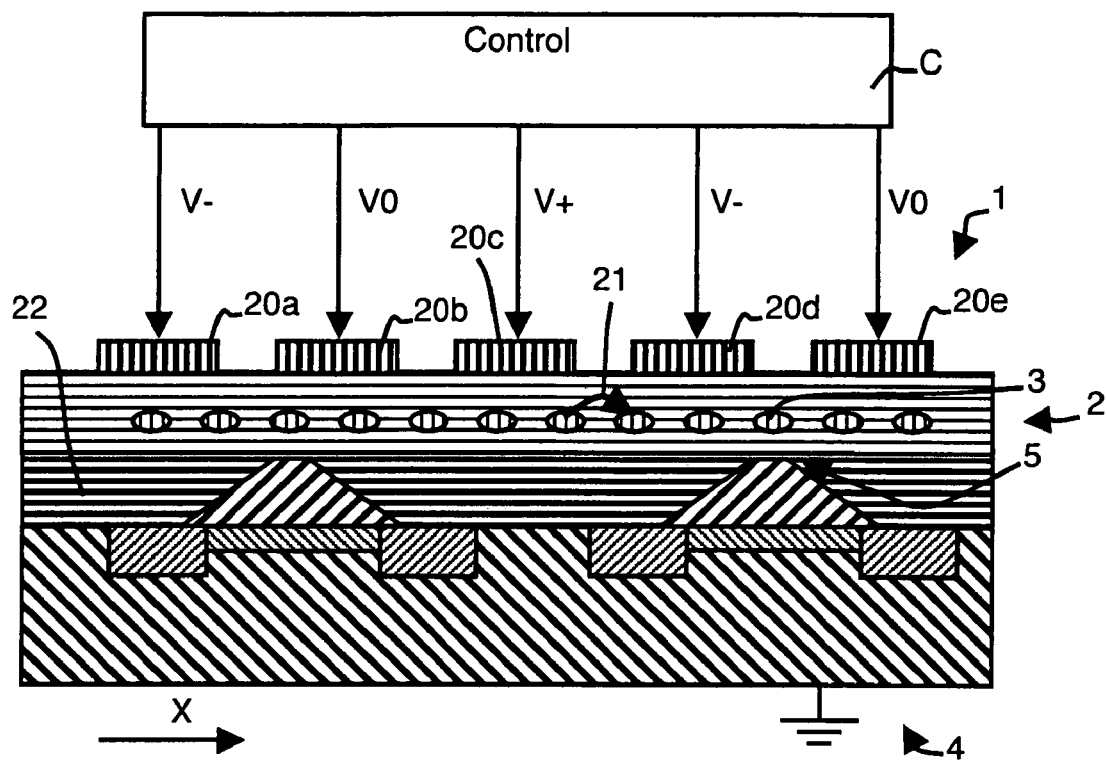
FIG. 5 illustrates a particular embodiment of a data recording system according to the invention, comprising an array of electrodes.
Figure 6:
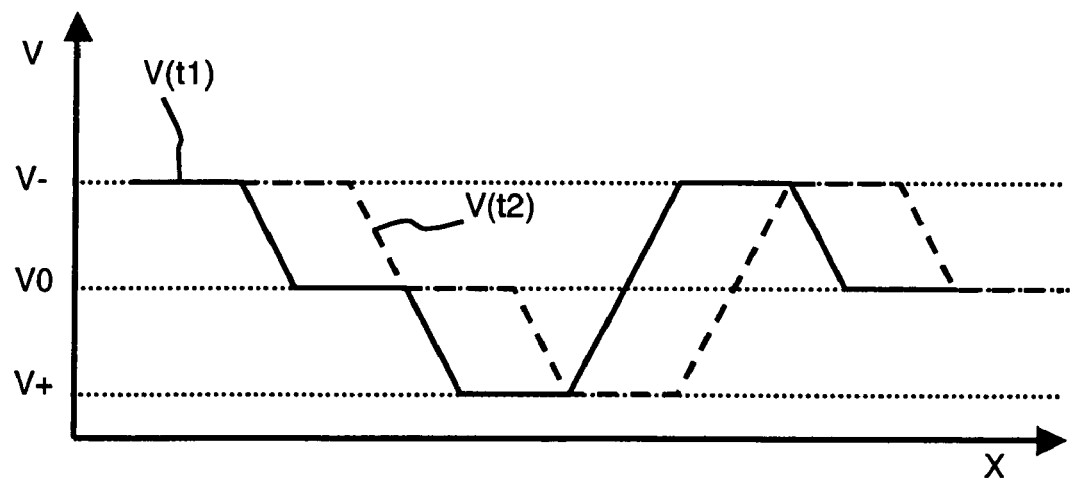
FIG. 6 illustrates the variations of an electric potential created by an array of electrodes according to FIG. 5.

In the particular embodiment represented in FIG. 5, the recording medium 1 and the read and/or write device 4 are integral to one another. In this case, the charges disposed on the dots 3 are preferably displaced by means of an electric field applied to the storage layer 2. In FIG. 5, an array of electrodes 20 controlled by a control device C is arranged on a rear surface of the storage layer 2 opposite the surface facing the micro-tips 5. In FIG. 5, five electrodes 20a, 20b, 20c, 20d and 20e are disposed along an axis X. The charges can be displaced from one dot 3 to the other along the axis X by means of the array of electrodes 20, as represented by the arrow 21 in FIG. 5. For example, as represented in FIGS. 5 and 6, at the time t1, a potential V− is applied to the electrodes 20a and 20d, a potential V0 is applied to the electrodes 20b and 20e and a potential V+ is applied to the electrode 20c. An electric potential well is thus created that is offset, at the time t2, along the axis X. The electric charges then follow the potential well and can in this way be displaced with respect to the micro-tips 5, and be detected when they are located on a dot 3 arranged facing a micro-tip 5. To obtain a two-dimensional charge displacement, a two-dimensional array of electrodes 20 is arranged on the rear face of the layer 2.

In FIG. 5, a second low-permittivity layer 22 surrounds all the micro-tips 5 so that the second low-permittivity layer 22 and the micro-tips 5 form a common flat surface. The second layer 22 can be achieved by deposition of glass, for example of the SOG (Spin On Glass) type. The assembly formed by the second low-permittivity layer 22 and the micro-tips 5 is preferably planarized in a common planarization step, for example by mechanical-chemical polishing. In the case where a relative displacement of the recording medium 1 and of the read device 4 is scheduled, the second layer 22 ensures a uniform mechanical contact thus enabling the micro-tips 5 to be protected. In the case where the recording medium 1 and read device 4 are integral to one another, the storage layer 2 can be achieved directly on the read device 4.

The access time to the stored data is shorter the shorter the distance between the micro-tips. The distance between two adjacent micro-tips is typically about a few micrometers. With a relative displacement speed between the charges and micro-tips of 5 mm/s, the access time is then substantially less than one millisecond. Reducing the pitch between the micro-tips is of another interest, as it also fixes the amplitude of relative displacement of the recording medium with respect to the device 4 thereby fixing the displacement actuator design rules. Moreover, small amplitudes are the key to a perfect contact of the surfaces of the device 4 and storage layer 2.

The invention is not limited to the embodiments represented. In particular, combining mechanical displacement of the storage layer 2 with respect to the micro-tips 5 and displacement of the charges with respect to the dots 3 can be envisaged.

The invention claimed is:

1. A data recording system comprising:
   a recording medium comprising:
      a storage layer able to store data,
      a plurality of electrically insulated conductive dots designed to store electric charges according to the data to be stored and creating corresponding electric fields;
   a data read and/or write device comprising an array of micro-tips having a base and a summit, wherein the summit is proximal to the storage layer and the base is integral with a transistor channel connecting a source and a drain, each micro-tip including an insulating high permittivity material; and
   means for relative displacement of the charges with respect to the micro-tips.

2. The system according to claim 1, wherein the means for relative displacement of the charges with respect to the micro-tips comprise means for relative displacement of the storage layer with respect to the micro-tips.

3. The system according to claim 1, wherein the recording medium and the data read and/or write device are integral with one another, the means for relative displacement of the charges with respect to the micro-tips comprise an array of electrodes arranged on a rear face of the storage layer opposite the face facing the micro-tips and able to cause displacement of the charges from one dot to the other.

4. The system according to claim 1, wherein the storage layer comprises conductive particles inserted in an insulating material.

5. The system according to claim 4, wherein the insulating material comprises silica and the conductive particles comprise silicon.

6. The system according to claim 1, wherein the transistor channel is formed by a material doped by a first type of doping and the source and drain are formed by a material doped by a second type of doping.

7. The system according to claim 1, wherein the transistor channel comprises a conductive element connected to the source and drain by tunnel junctions.

8. The system according to claim 1, wherein each of the micro-tips has the shape of a truncated pyramid.

9. The system according to claim 1, wherein each micro-tip comprises a high-permittivity layer arranged laterally on the micro-tip and separated from the high-permittivity material by a low-permittivity layer.

10. The system according to claim 1, comprising a second low-permittivity layer surrounding all of the micro-tips, so that the second low-permittivity layer and the micro-tips form a common flat surface.

11. The system according to claim 1, wherein each micro-tip comprises a control electrode.

12. A method for using a data recording system according to claim 11, comprising a write step involving injection of a charge into the storage layer by applying a potential difference between the control electrode and the source.

* * * * *